United States Patent Office 3,462,628
Patented Aug. 19, 1969

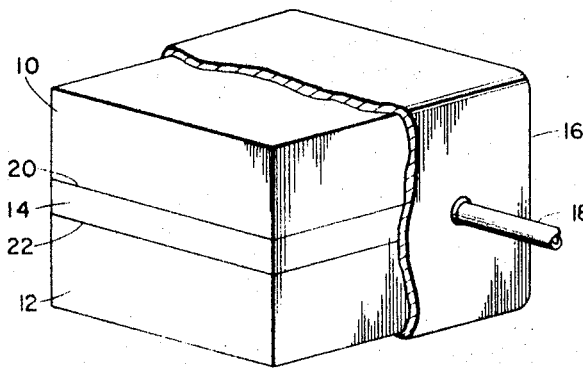
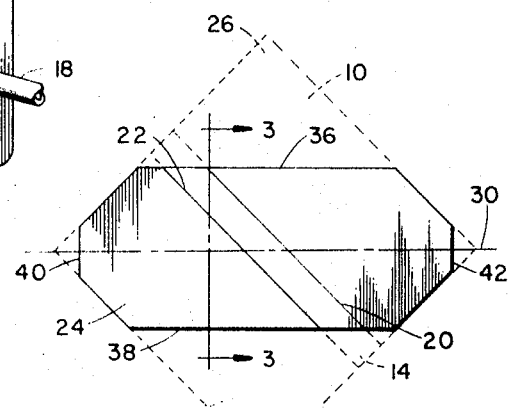
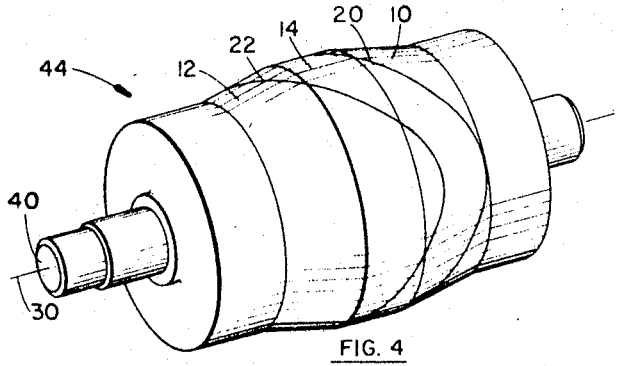
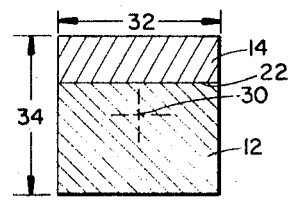
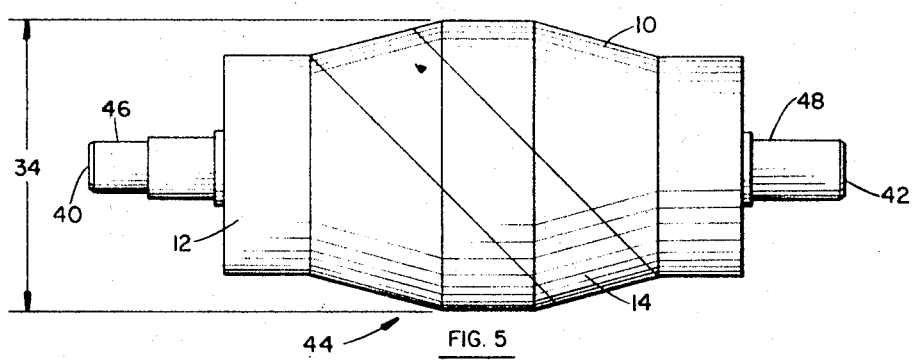
INVENTORS
NORMAN KLIMMEK, JOSEPH MELILL,
JULIAN P. KING JR., ROY H. LORENZ,
BY FRANK H. HOLLINGSWORTH
ATTORNEY

3,462,628
ROTATABLE MAGNETO-ELECTRIC ARMATURE AND METHOD OF FABRICATING SAME
Norman Klimmek, Palos Verdes Estates, Joseph Melill, Rolling Hills Estates, Julian P. King, Jr., Los Angeles, Roy H. Lorenz, Palos Verdes Peninsula, and Frank H. Hollingsworth, San Pedro, Calif., assignors to North American Rockwell Corporation, a corporation of Delaware
Filed Dec. 15, 1966, Ser. No. 601,996
Int. Cl. H02k 1/22
U.S. Cl. 310—264       16 Claims

ABSTRACT OF THE DISCLOSURE

A brushless generator rotor comprising a solid unitary mass made by joining two blocks of magnetic steel to an intervening layer of nonmagnetic metal, either by solid state diffusion bonding or by eutectic bonding. The solid unitary mass thus formed is thereafter trimmed by machining in a lathe to form a cylinder with the center diamagnetic layer at an angle of substantially 45 degrees with respect to the axis of rotation, and two identically configured pole pieces.

---

Where very high rotation speeds are involved in electric motors and generators such as turbine driven alternators and the like, maximum strength and resistance to temperature in the armature are of paramount importance. In aircraft and space vehicles, where maximum efficiency per pound of weight is a prime consideration, high rotating speeds for generator armatures are often essential in achieving the best ratio of power to weight. However, the maximum safe rotating speed of an armature is frequently limited by rotor size and the method of joining materials therein, particularly since the pole pieces are relatively massive and situated in spaced relationship from the rotation axis, whereby centrifugal loads are intensely magnified at high turning speeds. Many difficulties are commonly encountered in fabricating armatures for use in the foregoing context using conventional means of construction known to the prior art. Thus, for example, in a rotor designed to operate at high speed such as 10,000 r.p.m. or more, the pole pieces involve a substantial mass distributed and arranged with respect to the field windings according to certain critical dimensional relationships well known in the electric motor and generator art. Use of bolts or the like to secure such pole pieces to the armature assembly involves very high unit stress on such bolts with the result that large cross-sectional areas are necessary for sufficient holding strength in the bolts. The stated large size of bolts requires large holes in the pole pieces for passage of the bolts therethrough which has a generally deleterious effect on the symmetry and mass distribution of the pole pieces and the efficiency thereof in converting energy from the magnetic flux field to which they are dimensionally oriented with great care and precision.

Brazing of joints in armatures of the foregoing type is generally impractical due to the large areas usually involved. Faying surfaces of substantial size must be carefully prepared by precision grinding or the like, and are extremely difficult to braze in a complete 100% void-free joint even after costly machining operations. The uncontrollable and unpredictable flow patterns of brazing alloy in the liquid state create locally starved areas or voids at random locations throughout the faying surfaces involved, whereby local stress concentrations are produced in the limited areas where sound joints occur. The unit stress in large area brazed joints is therefore non-uniform and poorly distributed, which severely compromises the safety and reliability of a brazed armature where large centrifugal forces are produced during high speed rotation.

Similarly, where rotors for use in high speed alternators or the like are fabricated by welding, it is a particularly severe limitation of such rotors that welding cannot be accomplished in sufficient depth to distribute the stresses imposed by centrifugal force. Thus, welding by conventional tungsten electrode inert gas shielded techniques cannot penetrate deeper than one and one-half inches of thickness in two confronting surfaces of the components sought to be joined by this method. In a rotor or the like having a diameter of six inches, for example, the stresses imposed by centrifugal force thereon will be resisted by little more than one inch of weld zone thickness due to the inherent limitations on welding depth discussed above. If a deep groove be initially cut between the two components sought to be thus joined to increase the weld depth, the resulting massive nugget has an extremely adverse effect on the stress distribution pattern and magnetic characteristics of the armature so formed. Thus, where a welded joint occurs at or close to the periphery of a cylindrical rotor, all centrifugal stress in the entire rotor is concentrated in such joint and amounts to two or three times more than the stress imposed at the ecnter of a solid rotor of homogeneous mass having an equivalent size, weight, and rotating speed.

Accordingly, it is a principal object of this invention to provide rotatable armature means for electric generators, motors and the like having greater strength per unit weight than corresponding devices heretofore known.

It is another object of this invention to provide an improved fabrication method for an armature wherein superior strength at high stresses and high operating temperatures are achieved with commensurately improved operating efficiency and performance reliability.

Other important objects and advantages of the instant invention will become apparent upon a close reading of the following explanation of the invention, reference being had to the accompanying drawings, wherein:

FIGURE 1 shows a general perspective and partly cutaway view of a workpiece contained in a retort for diffusion bonding as the first step in practicing the novel method, FIGURE 2 shows a side elevational view of the workpiece shown in FIGURE 1 after initial trim cutting operations comprising an intermediate step of the process disclosed herein, FIGURE 3 shows a cross-sectional view taken along line 3—3 of FIGURE 2, FIGURE 4 shows a perspective view of a rotor fabricated from the workpiece shown in FIGURES 1 and 2, and FIGURE 5 shows a side elevational ivew of the rotor from FIGURE 4.

Referring to FIGURE 1, it may be seen that the inventive concept in this case contemplates the initial joinder of essentially three main workpiece components comprising upper and lower masses or blocks 10 and 12 of magnetic material arranged on either side of an intervening layer or mass 14 of non-magnetic material. Masses 10 and 12 will eventually comprise the two pole pieces of an armature after the fabrication steps discussed below, hence should comprise material having good magnetic permeability, while the material selected for mass 14 should have poor magnetic permeability approaching as closely as possible that identified with air. In addition to the foregoing magnetic characteristics, the materials comprising elements 10, 12 and 14 should exhibit essentially identical thermal coefficients of expansion, should have uniformly high strength on the order of 50,000 p.s.i. safe tensile yield stress or above at elevated temperatures such as 400° F. and should be capable of forming interface joints of the type contemplated herein having a strength as closely comparable as possible with that of the parent materials. Masses 10 and 12 may illustratively comprise magnetic steel of suitable alloy composition, that having AISI designation 4130 steel being illustrative. The stated alloy has the following approximate composition:

| | Percent |
|---|---|
| Carbon | .28–.33 |
| Manganese | .40–.60 |
| Silicon | .20–.35 |
| Chromium | .80–1.10 |
| Molybdenum | .15–.25 |
| Iron | Balance |

Intervening layer 14 comprises material having the requisite strength, poor magnetic permeability and high resistance to temperature such as one of the nickel or cobalt bases superalloys of which the alloy known as René 41 is illustrative. The stated alloy has the following approximate composition:

| | Percent |
|---|---|
| Chromium | 18–20 |
| Cobalt | 10–12 |
| Molybdenum | 9–10.5 |
| Iron | 4–6 |
| Carbon | .09–0.12 |
| Silicon | .4–.6 |
| Manganese | .05–.15 |
| Titanium | 3.0–3.3 |
| Aluminum | 1.4–1.6 |
| Nickel | Balance |

Workpiece components 10, 12 and 14 are initially joined by arranging the same in their desired final relationship within a retort or envelope 16 which may illustratively comprise a welded steel envelope capable of isolating the workpiece components from surrounding atmosphere and having sufficient strength to withstand application of pressure as discussed below. Retort or envelope 16 has a tube or conduit 18 attached thereto for communicating the enclosed area of the envelope with a vacuum pump or a source of inert gas (not shown) as may be expedient in achieving the best possible joint between items 10, 12 and 14.

Joinder of the three principal workpiece components within retort 16 is preferably accomplished either by solid state diffusion bonding or by eutectic bonding. Illustratively, two masses 10 and 12 of the mentioned 4130 steel were joined to a one-half inch thick plate of René 41 alloy on either side thereof with a .003 inch thick interleaf of Monel 400 situated at each of the two parallel interfaces defined by planes 20 and 22 in FIGURE 1. With the workpiece components arranged as suggested in FIGURE 1 and placed within a welded steel retort of the type shown, a pressure of 3,000 p.s.i. was applied on the top and bottom of the retort in a direction substantially normal to interface planes 20 and 22 to compress the components therewithin during simultaneous heating of the entire assembly at 2000° F. for five hours with a continuous vacuum purge through line 18. A successful uniform and continuous solid state diffusion bonded joint over a total area of approximately 340 sq. in. resulted from the foregoing procedure.

Alternatively, eutectic bonding of two masses 10 and 12 to an intervening layer of René 41 alloy was also accomplished by eutectic bonding using interleaf layers at each of the two interfaces comprising an alloy of 50% gold, 25% palladium and 25% nickel, these values being approximate and not exclusive. With the workpiece components and eutectic interleaf materials arranged within a retort as suggested by FIGURE 1, the entire assembly was exposed to a temperature of approximately 2000° F. for five hours with a continuous vacuum applied within retort 16 by means of line 18. The resulting joint exhibited a tensile strength in the range between 40–45,000 p.s.i. yield and 70–80,000 p.s.i. ultimate after slow cooling in the furnace from the bonding temperature. These values were increased approximately 10,000 p.s.i. in both cases after a subsequent normalizing heat treatment following the bonding step. The normalizing heat treatment consisted of heating the workpiece assembly to a temperature above the transformation range of the 4130 steel and thereafter gradually cooling the same in still air at room temperature. The advantage of eutectic bonding over the mentioned solid state diffusion bonding process to join masses 10, 12 and 14 is in the avoidance of high pressures and consequent lessened risk of dimensional changes in the masses under compression.

The foregoing processes illustratively described for joining masses 10, 12 and 14 result in a single solid essentially unitary mass wherein molecular interaction between each portion of the workpiece and the next adjoining portion are characterized by a strength approaching that of the parent materials as required for highly reliable and prolonged service life in the performance of the armature constructed therefrom, and the operation of which is characterized by very high rotating speeds above 20,000 r.p.m. and elevated temperatures such as 400° F. Because the integrity of the joints thus formed determines the maximum safe stress limit of the final part, uniformly high quality and defect-free joints are of crucial importance in the initial joining step described hereinabove in connection with FIGURE 1. Hence, the selection of materials for masses 10, 12 and 14 necessarily includes consideration of the joining properties between the stated masses for each combination of materials, in addition to the coefficient of heat expansion and dimensional stability characteristics already mentioned.

Following joinder of masses 10, 12 and 14 into a single solid unitary mass, designated by reference numeral 24 in FIGURE 2 for convenience, trimming operations are accomplished as required to form an elongate truncated billet. The stated operations involve removal of diagonally opposite corners 26 and 28 from masses 10 and 12, respectively, to produce a substantially square cross-sectional shape in elongate billet 24, as suggested by the equal length of dimensions 32 and 34 in FIGURE 3, each of which may coincide generally with the maximum diameter of the final part as suggested by reference numeral 34 in FIGURE 5. Removal of portions 26 and 28 is completed when two substantially parallel side surfaces 36 and 38 are uniformly spaced equidistantly on either side of a predetermined rotation axis 30 which will ultimately define the axial center of the finished rotor. Although axis 30 passes through masses 10, 12 and 14 at a desired angle with reference to interface planes 20 and 22, axis 30 may be considered as lying in a plane normal to interface planes 20 and 22. As suggested by FIGURE 2, the mentioned angle between axis 30 and planes 20 and 22 may conveniently be substantially 45 degrees. The diagonally opposite corners of billet 24 situated on axis 30 are also flattened by removal of material to produce substantially parallel surfaces 40 and 42, both being substantially normal to turning axis 30 and both having sufficient area for mounting billet 24 in a lathe for subsequent turning operations.

After the foregoing preliminary trimming operations, elongate billet 24 is mounted in a lathe for rotation about axis 30, and is further shaped by appropriate cutting operations to form the finished part. As shown by FIGURES 4 and 5, the finished rotor may be generally barrel shaped to orient pole pieces 10 and 12 to best advantage within a flux field of the motor or generator housing with which the rotor is operationally associated, but in any case is of generally cylindrical form. Due to its continuously solid and substantially uniform strength and mass, rotor 44 is characterized by internal stress patterns normally identified only with an entirely homogeneous mass rather than a composite rotor construction. Thus, at each radial increment of distance measured from rotation axis 30, the internal stresses resulting from centrifugal force during armature rotation are substantially uniform throughout the entire distance between the two opposite ends of the elongate rotor. Moreover, since rotation shaft portions 46 and 48 at each end of rotor 44 are integrally formed with pole pieces 10 and 12, as suggested in FIGURE 5, for example, shear stresses produced by a rotor torque or inertia are not locally concentrated between the shaft and pole pieces such as would occur if a separate joint were required to secure together individually formed shaft and pole piece components.

The improved strength characteristics permit rotor 44 to be coupled directly to turbines which are well known to require high rotating speeds in order to achieve their maximum efficiency. As a result, the rotor construction disclosed herein produces a maximum of power output for each pound of material in the rotor as referred to generally by those skilled in the art as the material utilization factor. Where the term molecular interaction is used herein, or equivalents thereof, it will be understood by those skilled in the art, that atomic activity is contemplated and included by the mentioned phrase.

While the particular details suggested above and in the drawings are fully capable of attaining the objects and providing the advantages herein stated, the structure and methods thus disclosed are merely illustrative and could be varied or modified to produce equivalent results without departing from the scope of the inventive concept as defined in the appended claims.

We claim:
1. A method of making an armature for high speed rotation in a magnetic field, said method comprising:
 joining a plurality of separate magnetically permeable workpiece components to opposite sides of intervening substantially nonmagnetically permeable material to form a single solid unitary mass, and
 shaping said mass to form a body of revolution with said magnetically permeable components having symmetrically corresponding configuration about the axis of said rotation.

2. The method set forth in claim 1 above, wherein:
 said magnetically permeable workpiece components are capable of bonding to said nonmagnetically permeable material to form a solid state joint, and
 said joining is accomplished by application of heat and pressure in amounts respectively sufficient to form said solid state joint.

3. The method set forth in claim 1 above, wherein:
 said magnetically permeable workpiece components and said non-magnetically permeable material are capable of forming a diffusion bonded joint having an interleaf layer therebetween, said interleaf layer comprising an alloy having aggressive atomic diffusing characteristics with respect to both said components and said material, and
 said joining is accomplished by application of sufficient heat to cause eutectic bonding between said interleaf layer and both said components and said intervening substantially non-magnetically permeable material.

4. The method set forth in claim 3 above, wherein:
 said interleaving material consists of an alloy comprising gold, palladium and nickel.

5. The method set forth in claim 1 above, wherein:
 said intervening substantially non-magnetically permeable material is in the form of a solid metallic plate having substantially flat parallel opposed surfaces, and
 said shaping comprises cutting operations during rotation of said single solid unitary mass to remove portions of said mass with said surfaces of said plate oriented at substantially a 45 degree angle relative to the axis of said rotation of said single solid unitary mass.

6. The method set forth in claim 5 above, wherein:
 said plurality of separate magnetically permeable workpiece components comprise a pair of identical pole pieces, and
 said shaping further comprises removal of material from said mass to form shaft means integrally on each of said pole pieces for rotatably supporting said armature.

7. The method set forth in claim 1 above, wherein:
 said magnetically permeable workpiece components comprise a molybdenum steel alloy,
 said substantially non-magnetically permeable material comprises a nickel base super alloy, and
 said joining is accomplished by application of heat and pressure in respectively sufficient amounts to produce a solid state diffusion bonded joint between said steel alloy and said super alloy.

8. The method set forth in claim 7 above, wherein:
 said nickel base super alloy essentially comprises from about 18–20% chromium, from about 10–12% cobalt, from about 9–10.5% molybdenum, from about 4–6% iron, from about .09–0.12% carbon, from about .4–.6% silicon, from about .05–.15% manganese, from about 3.–3.3% titanium, from about 1.4–1.6% aluminum, and the balance nickel.

9. A method of making an armature for high speed rotation in a magnetic field, said method comprising:
 joining a pair of separate magnetically permeable metallic masses to an intervening parallel sided plate of substantially non-magnetically permeable metallic material by application of sufficient heat and pressure to produce a diffusion bonded joint therebetween, and
 shaping said single solid unitary mass by rotating the same and cutting thereon to form said magnetically permeable masses intto symmetrically corresponding configuration about the axis of said rotation, with said axis oriented at an acute angle in relation to said parallel sides of said plate.

10. An armature for rotation in a magnetic field, comprising:
 a plurality of separate magnetically permeable pole pieces joined to and separated by an intervening mass of substantially non-magnetically permeable material, symmetrically arranged about the axis of said rotation, and an atomic diffused joint between each of said pole pieces and said intervening mass.

11. The structure set forth in claim 10 above, wherein:
 said pole pieces comprise magnetizable steel, and
 said substantially non-magnetic material comprises a nickel base super alloy.

12. An armature for rotation in a magnetic field, comprising:
 an elongate body of revolution having a magnetically permeable mass of metallic mterial formed at each end thereof, said masses being joined to and separated by an intervening plate of substantially non-magnetically permeable material,
 said plate having substantially parallel sides,
 said plate being symmetrically oriented with the center longitudinal axis of said body of revolution passing through the cross-sectional center of said plate, and
 said parallel sides forming an acute angle with said longitudinal axis.

13. The structure set forth in claim 12 above, further including:
 an interleaving layer of material having aggressive atomic diffusion characteristics contacting each of said parallel sides and situated between said magnetically permeable masses and said plate.

14. The structure set forth in claim 13, above, wherein: said interleaving material consists of an alloy comprising gold, palladium and nickel.

15. The structure set forth in claim 10 above, wherein: said magnetically permeable pole pieces comprise a molybdenum steel alloy, and said substantially non-magnetically permeable material comprises a nickel base super alloy.

16. The structure set forth in claim 10 above, wherein: each of said pole pieces has integrally formed thereon a projecting portion comprising shaft support means for said body of revolution and adapted to rotate therewith.

References Cited

UNITED STATES PATENTS

| | | |
|---|---|---|
| 3,204,136 | 8/1965 | Kaiwa et al. |
| 3,206,623 | 9/1965 | Snowdon _ _ _ _ _ _ _ _ _ _ _ _ 310—49 |

FOREIGN PATENTS 255,222   6/1948   Switzerland.

WARREN E. RAY, Primary Examiner

R. SKUDY, Assistant Examiner

U.S. Cl. X.R.

29—598